United States Patent [19]
Krampe

[11] 3,938,248
[45] Feb. 17, 1976

[54] STRIPPING TOOL FOR A CABLE HAVING COVER MADE OF A SYNTHETIC MATERIAL

[76] Inventor: Josef Krampe, Werner Strasse 4, 4711 Herbern, Germany

[22] Filed: Aug. 29, 1974

[21] Appl. No.: 501,758

[30] Foreign Application Priority Data
Sept. 12, 1973 Germany............................ 2345938

[52] U.S. Cl. ...................... 30/90.4; 7/5.1; 30/90.9; 30/91.1
[51] Int. Cl.² ..................... B21F 13/00; B26B 27/00
[58] Field of Search ......... 30/90.4, 90.8, 90.9, 91.1, 30/91.2, 286, 289; 7/4, 5, 5.1

[56] References Cited
UNITED STATES PATENTS

| | | | |
|---|---|---|---|
| 464,088 | 12/1891 | Steves | 7/5 |
| 1,561,993 | 11/1925 | Nielsen | 7/5.1 X |
| 2,102,047 | 12/1937 | Van Nader | 30/289 X |
| 2,180,457 | 11/1939 | Butkiewicz | 30/289 X |
| 2,300,087 | 10/1942 | Anello | 30/90.9 |
| 2,398,979 | 4/1946 | Vaughan | 30/289 X |
| 3,818,590 | 6/1974 | Peter et al. | 30/90.4 |

*Primary Examiner*—Al Lawrence Smith
*Assistant Examiner*—J. T. Zatarga
*Attorney, Agent, or Firm*—Kenyon & Kenyon Reilly Carr & Chapin

[57] ABSTRACT

An improved stripping tool for stripping the outside cover layer from a cable having a plastic or synthetic cover layer in which a guide shoe for insertion between the cable and the outer layer and a knife surface adjacent thereto are mounted to a elongated member which during cutting lies parallel to the cable with an articulated handle being fastened to said elongated member and containing two sectored gear wheels for engaging the cover surface and moving the knife blade along the cable lengthwise.

7 Claims, 3 Drawing Figures

STRIPPING TOOL FOR A CABLE HAVING COVER MADE OF A SYNTHETIC MATERIAL

BACKGROUND OF THE INVENTION

This invention relates to cables in general and more particularly to an improved stripping tool for cables having a plastic or synthetic covering layer.

Cables of this nature such as electrical cables must in some instances have their outer covering layer of insulation stripped off. A typical type tool used in the prior art for this purpose is in the form of tongs and works on the principal of a can opener. At the top of the tool a knife that slides along a shoe inserted between the interior of the cable and the covering of the cable is provided. Advancement of the knife for the cutting operation is accomplished through the use of transporting wheels formed as gear wheels. The tool is driven by an attached wrench which is turned by hand. The tongs permit the knife to be held in the cable as the transporting wheels are pressed against the outside of the cable cover. Although this type of tool operates fairly well it has a serious drawback; both hands are required to operate the device and as a result the cable itself can not be firmly held. The cable is held only by the clamping action of the tongs on the cable covering. What this means is that thin or weak cables can not be held with the desired accuracy or can not be held at all during cutting operations and as a result damage such as cutting of the conductors in the cable, can result. In other words this prior art device becomes more and more difficult to use as the cable size decreases unless a special overlayer or underlayer is made for the cable. This problem in the prior art apparatus results primarily from the inability to support the cable when repositioning the knife cutting surface. That is to say, that the gear sectors are capable in a only limited travel. Where stripping beyond the travel which can be obtained with one gear rotation using the handle is necessary, problems can occur during repositioning which result in cutting of the conductors.

In view of these difficulties with the prior art device it is the object of the present invention to provide a device of this nature which permits also holding the cable during the cutting operation and thereby permits the cutting tool to be used for accurately stripping cables of a lesser diameter than was heretofore possible.

SUMMARY OF THE INVENTION

The arrangement of the present invention overcomes this problem. The present invention permits manipulation of the tool while at the same time holding the cable firmly so that it may be used for cables of all diameter ranges and so that it is possible to readjust the knife when making more than one cut. This is achieved in accordance with the present invention with a tool having two parts which are articulated together. The first part is made in an elongated rail shape and has at its end a stationary knife and a guide shoe adjacent thereto. The second part includes two half gear wheels through whose rotation the cable is caused to move with respect to the first part to result in cutting or stripping of the cable covering. The gear sectors are attached to a lever for that purpose. The lever is supported in the rail like member in a slot disposed at an angle relative to the point of engagement of the knife. The rail which is placed against the side of the cable permits firmly holding both the tool and the cable as they are pressed against each other using one hand while operating the lever to perform cutting with the other hand. As cutting occurs the rail slides downward along the side of the cable while at the same time the knife cuts into the cable covering. When repositioning the handle to cut further, the cable is still firmly grasped along with the rail of the tool preventing any damage to the conductors inside. Thus the tool of the present invention permits at the same time holding and guiding the cable and holding the tool which is cutting the cable.

DETAILED DESCRIPTION OF THE PREFERRED EMBODIMENT

Figure 1:
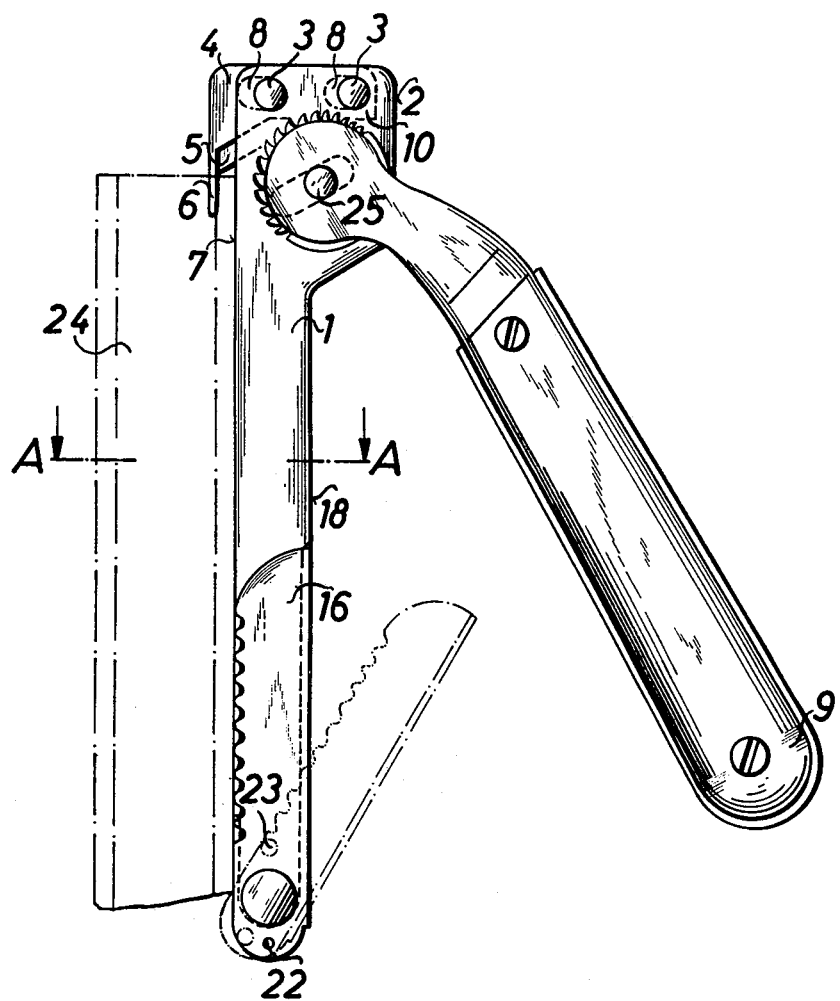
FIG. 1 is an elevation view of the tool of the present invention.

The tool of the present invention as illustrated on FIG. 1 is made up of two basic elements. The first of these is a rail 1 against whose face 7 a cable such as the cable 24 shown in dot-dash lines may rest. It is in the form of an elongated flat piece of iron having at its top a widen part forming a head 2. On the head is attached, using two appropriate screws 3, a cutting knife 4 with its cutting edge 5 projecting from the face 7 of the rail 1. In front of the cutting edge 5 is a guide shoe 6. The spacing of the shoe and knife from the face 7 of the rail 1 can be adjusted by loosening the screws 3 which pass through elongated holes 8 formed in the knife 4. The second main part of the tool of the present invention is the handle 9. It is fastened to the head 2 of the rail 1 using a bolt 25 passing through an elongated slot 10 in the head 2. As shown, the slot is at an angle to the face 7. The lever 9 is supported for rotation about the bolt 25 and for lateral movement in the slot 10. As a result it is adjustable both rotationally and along an angle relative to the point where the knife 4 is engaged.

Figure 2:
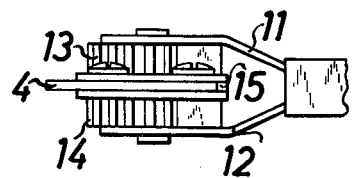
FIG. 2 is a plan view of the tool of FIG. 1.

As shown on FIG. 2 the lever 9 preferably has at its end two arms 11 and 12, one being on each side of the rail 1. Interposed between the rail 1 and the arms 11 and 12 are gear wheels 13 and 14. These will be rigidly fastened to the arms 11 and 12 by any conventional means such as welding, sodering, screwing etc. In accordance with a preferred form of the invention the knife 4 is set into a slot 15 formed in the head 2 of the rail 1.

Figure 3:
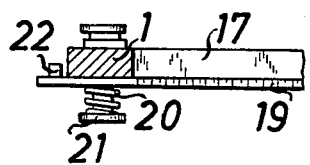
FIG. 3 is a section through the tool of FIG. 1 illustrating a further feature of the present invention in the form of a folding jack knife.

A further feature of the invention is a jack knife 16 which is supported at the bottom of the rail 1 in such a manner that it can be opened out from the rail 1. As shown on FIG. 3 it is of an angular cross-section and in its folded state, shown in solid lines on FIG. 1, rests with a leg 17 against the side 18 of the rail 1 i.e., the face of the rail opposite the face 7 which is applied against the cable 24. The jack knife 16 is used to cut off strips of the cable which have been stripped longitudinally by the knife 4. The cutting edge 19 of the knife 16 is designed so that the angular backside is always turned toward the interior of the cable during a cutting operation so that the strips covering the cable are always cut from the inside toward the outside preventing any damage to conductors. Prior to the tool of the present invention the usual practice has been to cut the covering from the outside toward the inside. This however produces a danger of damaging very thin and fine wires through the cutting operation. As shown on FIG. 3 the jack knife 16 is fastened to the rail 1 through the use of a screw or the like 21 and is under the pressure of a spring 20. In addition a pin 21 is provided which will engage in a hole 23 in the application rail when the jack knife is extended. In its fully extended position it will then act as an extension of the rail 1. In dotted lines it is shown in a partially opened position.

In operation, the cable 24 which is to be stripped is placed against the rail 1 in the manner shown on FIG. 1. The cable 24 and the rail 1 are held with one hand. The knife 4 which is placed at the open end of the cable in the manner shown is then used to cut the cable by moving the lever and the gears 13 and 14 therewith downward in the slot until in contact with the cable cover after which the handle is rotated to move the cable with respect to the rail 1. If a single rotation of the lever 9 does not result in a cut or sufficient length the lever is pulled backward in the slot 10 and rotated upward after which it is again caused to engage the covering and rotated again. As many pivotings of this nature as are required to get the proper length of cut are made. Throughout the manipulation of the lever to obtain a number of cuts along the same line the cable is adequately supported against the rail 1 by the operator holding both tobether. Depending on the size of the cable a plurality of longitudinal cuts of this nature will be made at a differend positions to expose strips of covering. These strips are then cut off using the jack knife 16 with cutting done from the inside out to prevent any damage to wires in the cable.

Thus, an improved cutting tool for stripping cables having a covering made of a synthetic plastic material has been shown. Although a specific embodiment has been illustrated and described, it will be obvious to those skilled in the art that various modifications may be made without departing from the spirit of the invention which is intended to be limited solely by the appended claims.

I claim:

1. In a stripping tool for cutting the covering of a cable covered with a layer of synthetic material comprising two articulated parts one of which includes a stationary knife and the other which is a handle having at one end a gear wheel non-rotatably fixed thereon and divided in half and with the halves disposed on each side of the handle, the other part being mounted to the one part so that the gear wheels can be rotated by the handle to effect relative motion between the cable and the knife, the knife being introduced between the interior of the cable and the cable covering and including a guide shoe which guides the knife as it cuts into the cable covering, the improvement comprising:
   a. the one part made in the form of an elongated rail to one side of which the cable can be applied, said rail having an enlarged head at one end;
   b. said knife and shoe arrangement projecting from said one side of said elongated rail at said head;
   c. an elongated angled slot formed in said head; and
   d. shaft means passing through the center of the gear halves and said angled slot whereby said gear wheels will be supported for rotation by said handle about the axis of said shaft and wherein said axis can be moved linearly at an angle opposite the point of an engagement of said knife.

2. The tool according to claim 1 wherein said handle is divided into two arms at the end coupled to said gear wheel halves and wherein said gear wheels are supported in said angled slot by means of a bolt passing through both of said arms and said slot with the gear wheel halves interposed on each side of said rail between said rail and one of said arms.

3. A tool according to claim 1 wherein said knife is attached to said head by means permitting adjustment of the amount of projection of said knife blade from said rail.

4. A tool according to claim 3 wherein said means of attachement comprise screws and wherein said knife contains elongated holes through which said screws pass.

5. The tool according to claim 1 and further including a jack knife attached to the lower end of said rail.

6. A cutting tool according to claim 5 wherein said jack knife has a right angle cross-section and in a closed position rests with its angled portion against the side of said rail opposite that which contacts the cable.

7. A cutting tool according to claim 6 wherein said knife can be rotated to a position wherein it forms elongation of said rail and further including a pin in said knife and a hole in said application rail for engaging said pin to hold said knife in an open position.

* * * * *